UNITED STATES PATENT OFFICE.

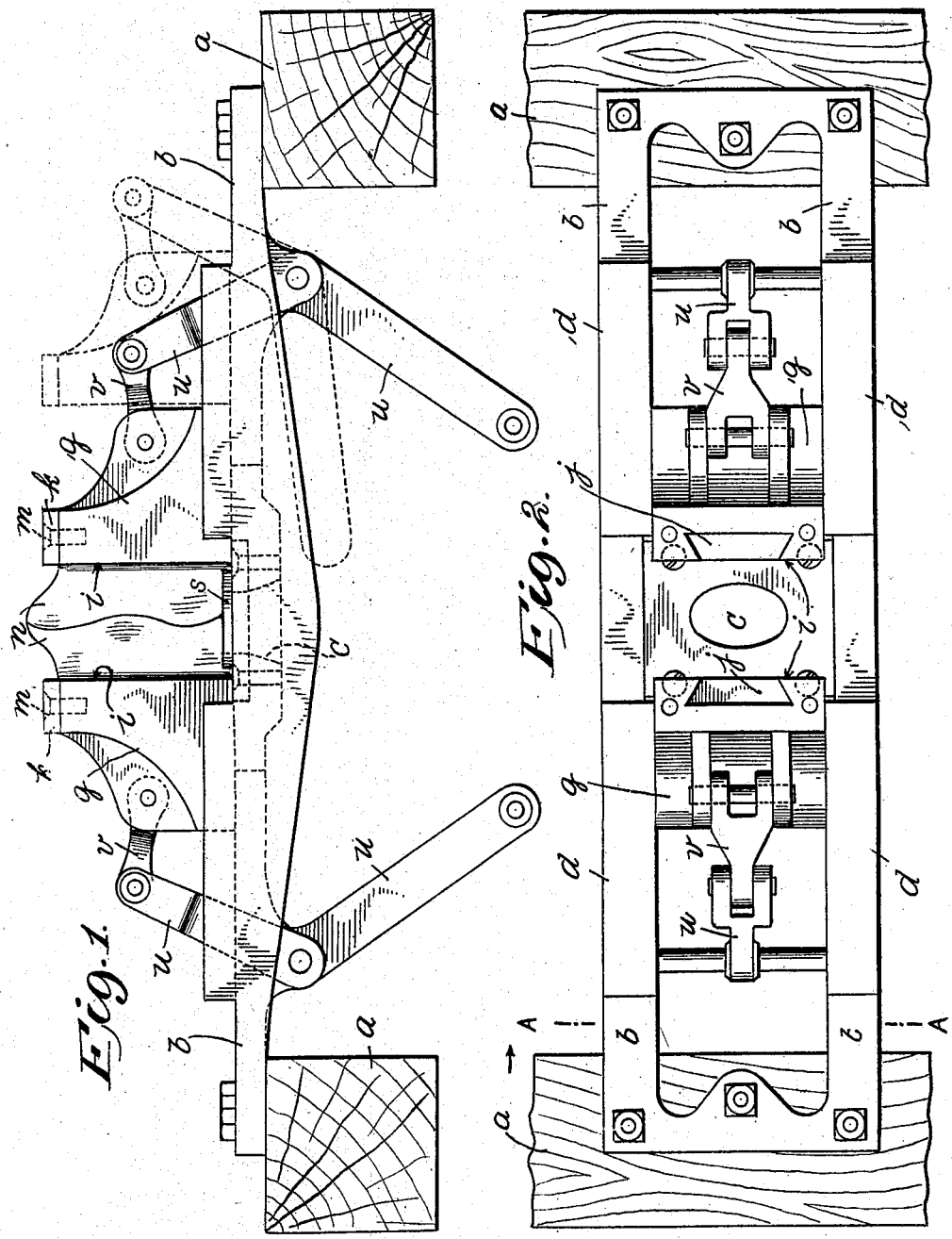

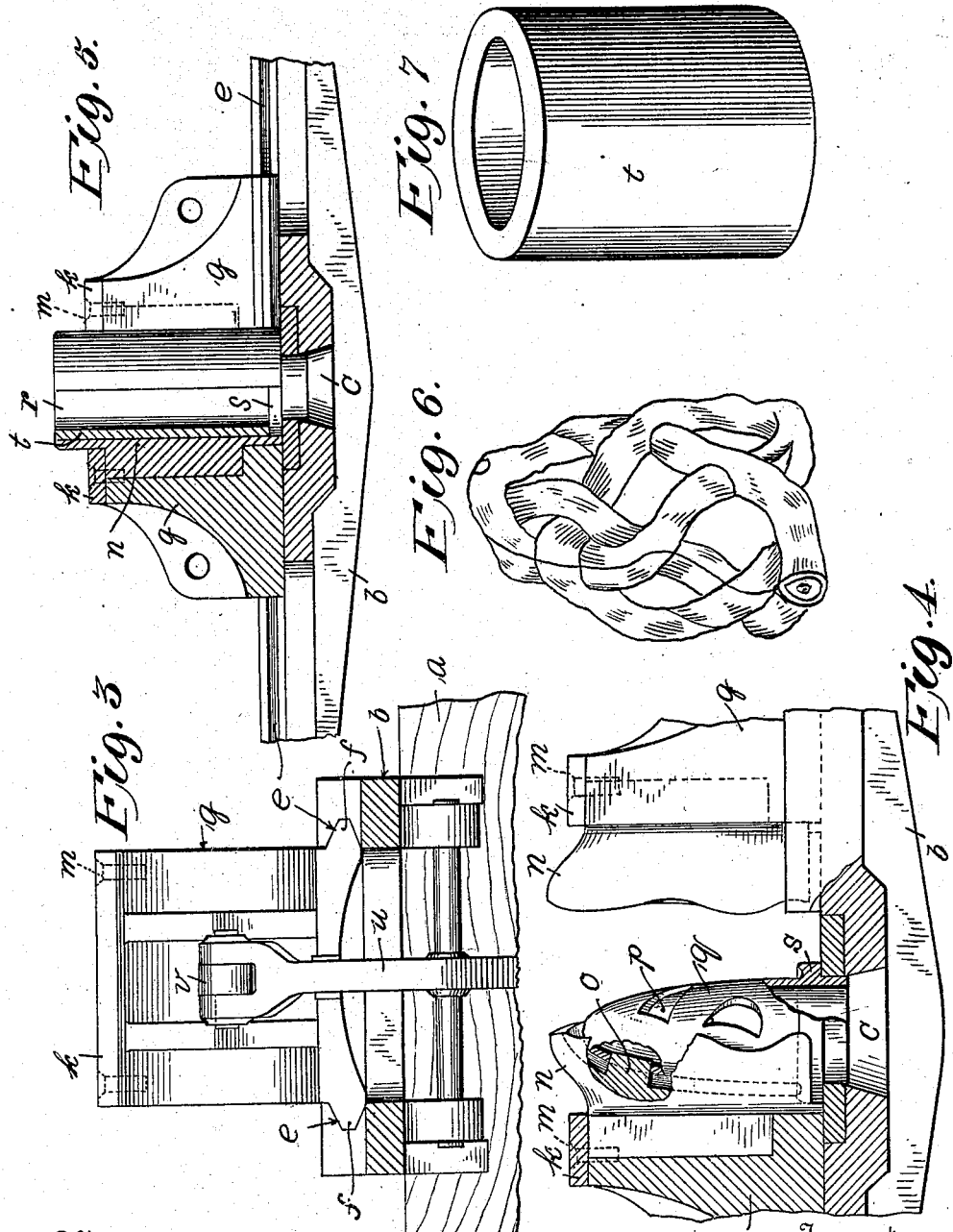

JAMES A. WILLIAMS, OF IRONTON, OHIO.

MOLDING-MACHINE.

No. 900,633.     Specification of Letters Patent.     Patented Oct. 6, 1908.

Application filed January 6, 1908. Serial No. 409,433.

*To all whom it may concern:*

Be it known that I, JAMES A. WILLIAMS, a subject of Great Britain, residing at Ironton, in the county of Lawrence and State of Ohio, have invented certain new and useful Improvements in Molding-Machines, of which the following is a specification, reference being had to the accompanying drawings.

My invention relates to improvements in molding machines and particularly to machines for molding hollow articles which are made by the machine in one piece and at practically one operation.

An object of my invention is to provide a molding machine of the character described which will be simple in construction, comparatively cheap in manufacture and most efficient in operation.

In the drawings illustrating the principle of my invention and the best mode now known to me of applying that principle, Figure 1 is a side elevation of my new molding machine; Fig. 2 is a plan view of the same, the dies being shown removed; Fig. 3 is a section on line A—A of Fig. 2; Fig. 4 is a detail partly in section, and parts being broken away to show the hollow core; Fig. 5 is a detail, partly in section, showing a cylindrical core; Fig. 6 shows a piece of gas fuel molded upon my new machine; and Fig. 7 shows a tube of prepared clay from which the finished hollow clay article is made.

To the frame members $a$ is bolted the bed $b$ formed with a central aperture $c$ on each side of which is a pair of guide-ribs $d$ grooved on the inside to form the guideways $e$. In the latter fit the ribs or flanges $f$ on the base of the slidable carrier-blocks $g$. There are two of the latter, one upon each side of the central aperture $c$. The opposed inner faces $i$ of these carrier-blocks $g$ are formed with dove-tailed recesses $j$ in which are secured by the cap-plates $k$ and screws $m$ the molds or dies $n$. The latter are made of brass or other suitable metal and their working faces are shaped in conformity with the design of the article to be made, and the edge of the working face may be straight or may be undulating as shown in Fig. 1. Where the hollow article to be molded is to be provided with perforations, the working face of the die $n$ is formed with lugs or studs $o$ (Fig. 4), which in the closed position of the dies enter the holes $p$ in the hollow core $q$. The material forced into the hollow core $q$ by the studs $o$ falls through the central opening $c$ in the bed $b$ of the machine.

In Fig. 5 is shown a cylindrical core $r$. The cores $q$, $r$ may be made of the same material as are the dies $n$; and like the latter, they may be removed and replaced by others of different design. The cores are formed with a ledge $s$ which serves as a stop for the molds or dies $n$ and around which the latter in their closed position fit tightly. The ledge $s$ serves as a seat for the tube $t$ (Fig. 7) of prepared clay from which the finished article is to be made. This tube $t$ of prepared clay may be made upon an ordinary clay wad machine or press and sufficient surplus material is provided to insure that all the cavities in the dies will be filled, when the latter are forced against the tube. The width of the ledge $s$ determines the thickness of the product at that point; and it will be understood that the material to be molded will fill the space between the working faces of the dies and the cores $q$, $r$. Each carrier-block $g$ is reciprocated by means of a lever $u$ the upper end of which is connected with the block by a link $v$ and the lower end of which is attached to any suitable operating device (not shown).

I claim:

1. The combination with a bed formed with an aperture, of a pair of carrier-blocks mounted free to be moved on said bed; a die carried by each of said carrier-blocks; a hollow core the interior of which communicates with the aperture in said bed; and mechanism for moving said carrier-blocks towards said core.

2. The combination with a bed, of a pair of carrier-blocks mounted free to be moved thereon; a die carried by each of said carrier blocks; a core formed with a ledge which supports said core on said bed and upon which rests the material to be molded; and mechanism for moving said carrier-blocks towards said core.

3. The combination with a bed, of a pair of carrier-blocks mounted thereon; dies carried by said carrier-blocks and formed with studs; and a hollow core formed with holes adapted to receive said studs.

4. The combination with a bed, of a pair of carrier-blocks mounted thereon; dies carried by said carrier-blocks and formed with studs; and a hollow core formed with a ledge and with holes adapted to receive said studs.

5. The combination with a bed formed with an aperture, of a pair of slidable carrier-blocks mounted one on each side of said aperture; dies mounted on said carrier-blocks and formed with studs; and a hollow core mounted over said aperture and formed with holes adapted to receive said studs.

6. The combination with a bed formed with an aperture, of a hollow core mounted over said aperture and formed with holes; dies formed with projections adapted to enter the holes in said core; and means for forcing said dies towards said core.

7. The combination with a bed formed with an aperture, of a pair of carrier-blocks mounted on said bed; a die carried by each of said carrier-blocks; a hollow core the lower end of which projects into said aperture and is formed with a ledge which supports said core upon said bed; mechanism for moving said carrier blocks towards said core.

In witness whereof I have hereunto set my hand in the presence of the two undersigned witnesses at said Ironton this second day of January A. D. 1908.

JAMES A. WILLIAMS.

Witnesses:
   THOS. D. SHRIHEY,
   S. S. LITTLEJOHN.